United States Patent [19]
McClure et al.

[11] Patent Number: 6,047,982
[45] Date of Patent: Apr. 11, 2000

[54] HITCH FOR AGRICULTURAL IMPLEMENT

[75] Inventors: John R. McClure; Larry D. Hall; William D. Hotaling, all of New Holland, Pa.

[73] Assignee: New Holland North America, Inc., New Holland, Pa.

[21] Appl. No.: 09/062,990

[22] Filed: Apr. 20, 1998

[51] Int. Cl.[7] .................................................. B60D 1/04
[52] U.S. Cl. ..................... 280/515; 280/504; 280/508; 280/510
[58] Field of Search ................................. 280/508, 509, 280/510, 515, 504

[56] References Cited

U.S. PATENT DOCUMENTS

| | | | |
|---|---|---|---|
| 774,903 | 11/1904 | Ammann | 280/508 |
| 2,783,059 | 2/1957 | Hartl | 280/509 |
| 3,052,487 | 9/1962 | Harbers et al. | 280/508 |
| 3,727,958 | 4/1973 | Peters | 280/508 |
| 3,786,945 | 1/1974 | Symonds | 214/42 |
| 3,818,955 | 6/1974 | Kline | 141/12 |
| 3,826,517 | 7/1974 | Hunter | 280/504 |
| 3,834,738 | 9/1974 | Koch | 280/504 |
| 4,368,899 | 1/1983 | Smalley et al. | 280/504 |
| 4,376,609 | 3/1983 | Bohman et al. | 414/335 |

Primary Examiner—Daniel G. DePumpo
Attorney, Agent, or Firm—Frank A. Seemar; Larry W. Miller; J. William Stader

[57] ABSTRACT

A hitch assembly for coupling a first agricultural implement, such as a forage wagon, to a second agricultural implement, such as a self propelled or pull type forage harvester. The hitch assembly includes a substantially vertical hitch pin affixed to the first agricultural implement, and a drawbar affixed to and extending rearwardly from the second agricultural implement. A hitch plate, affixed to the drawbar, has a rearwardly facing notch adapted to accommodate the pin under conditions where the first agricultural implement is positioned adjacent the drawbar. A latch plate pivotally mounted on the hitch plate, reciprocates between open and closed positions, for holding the pin in the notch under conditions where the pin is accommodated by the notch and the latch plate is in the closed position. The latch plate is held in the closed position by a latch reciprocal between extended and retracted conditions. When the hitch pin is urged out of the notch, the latch plate applies a varying force against the latch at levels of force proportionate to the force applied by the pin. An actuator, coupled to the latch, is adapted to move the latch from its extended position to the retracted position when the force against it is below a predetermined threshold. Additionally, a supplemental spring assembly moves the latch from the extended position to the retracted position under conditions where the force against the latch moves through such threshold.

12 Claims, 6 Drawing Sheets

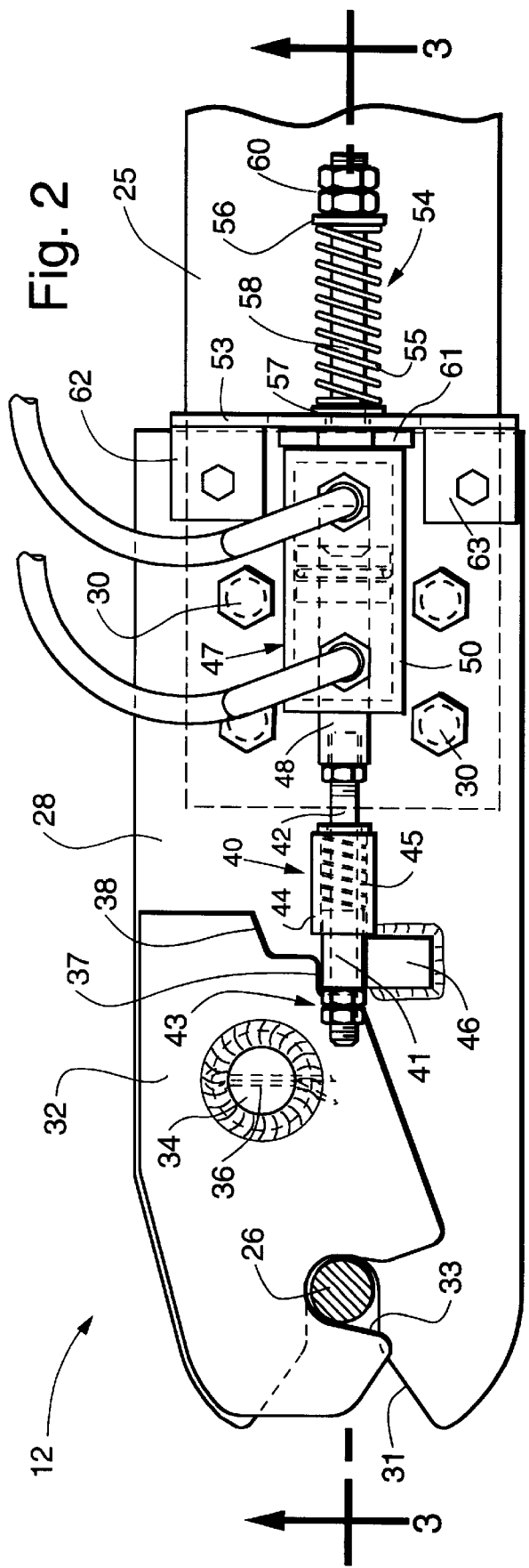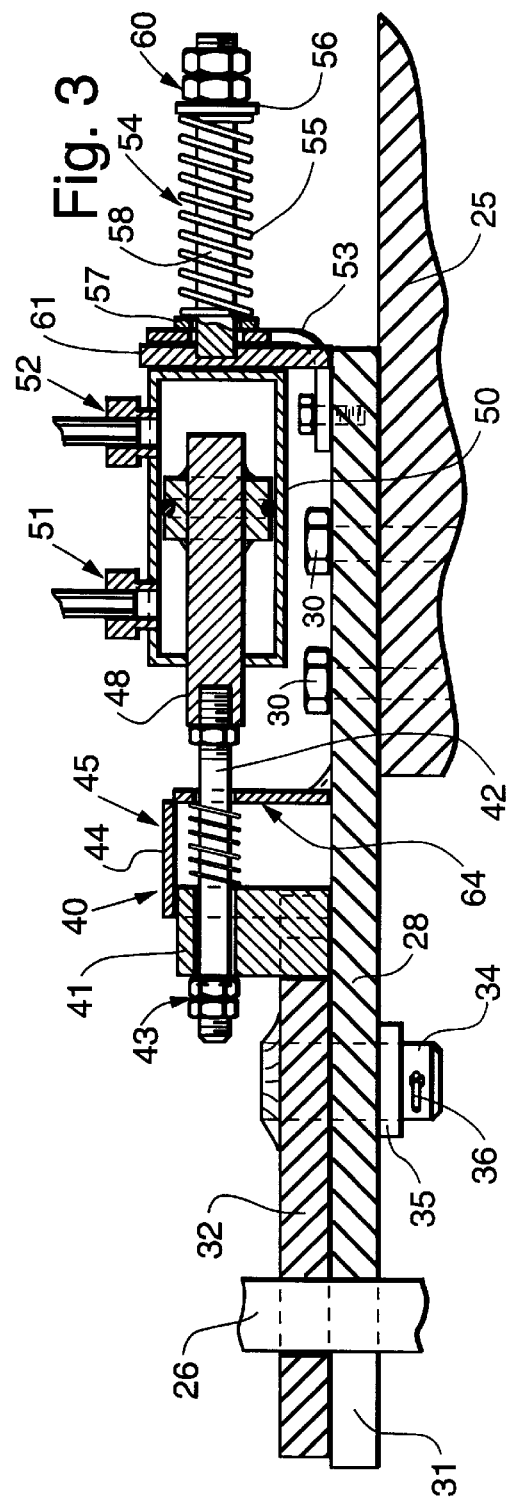

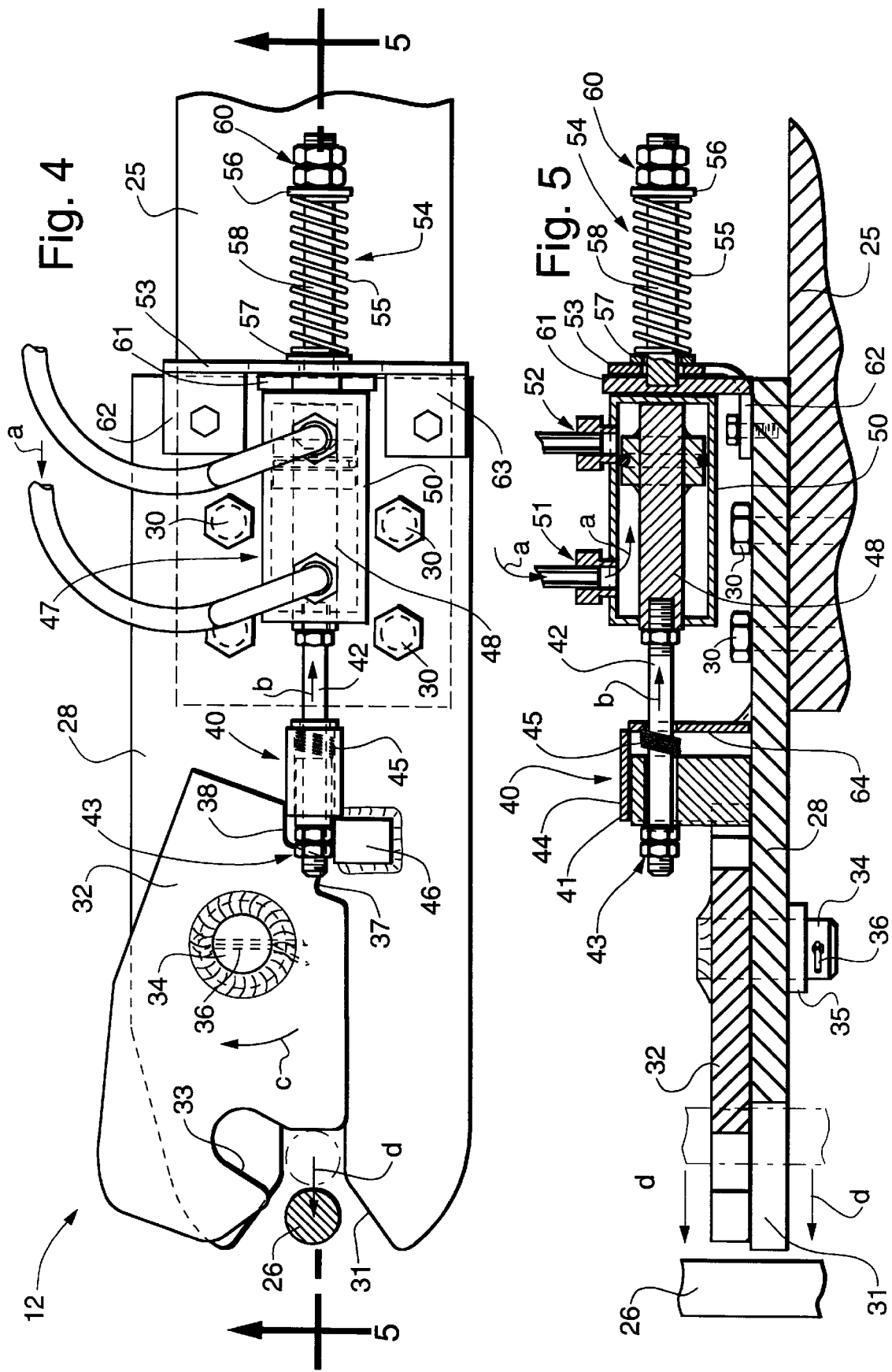

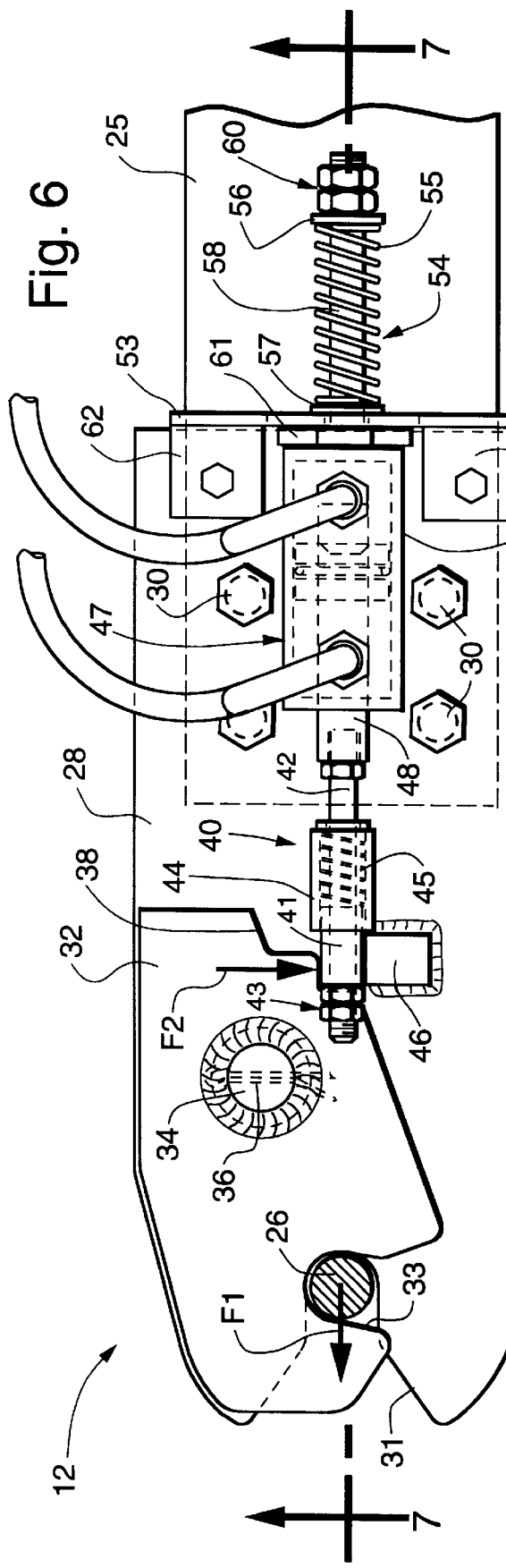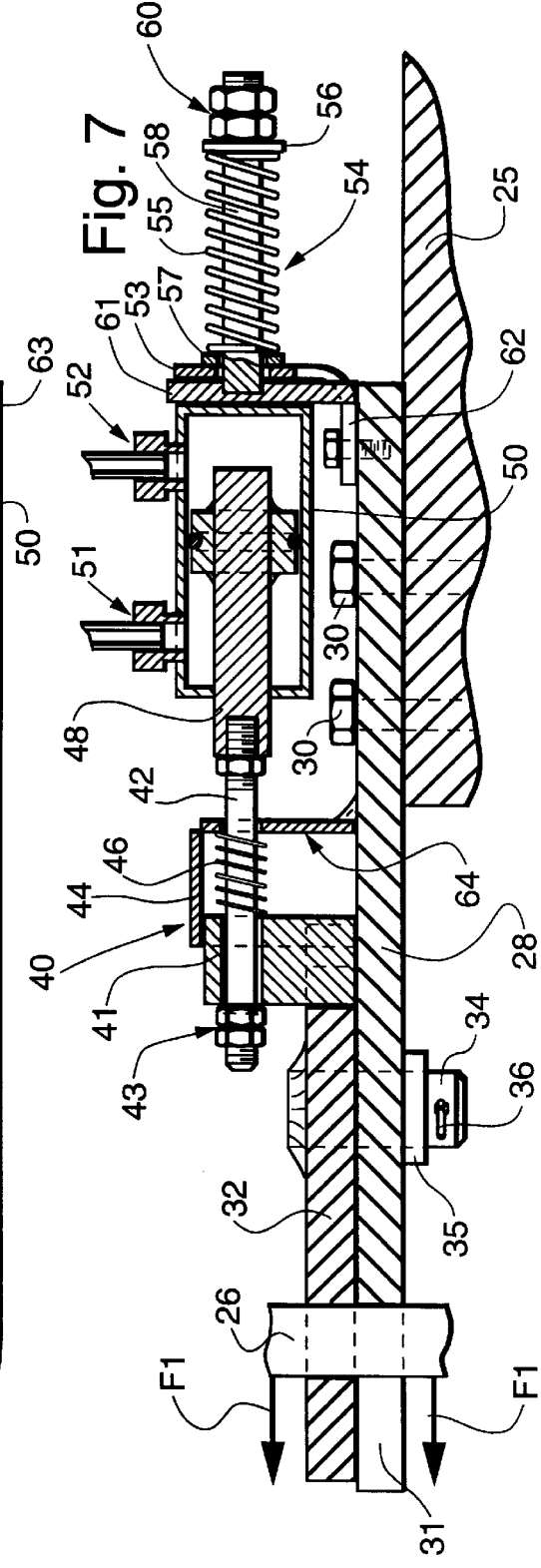

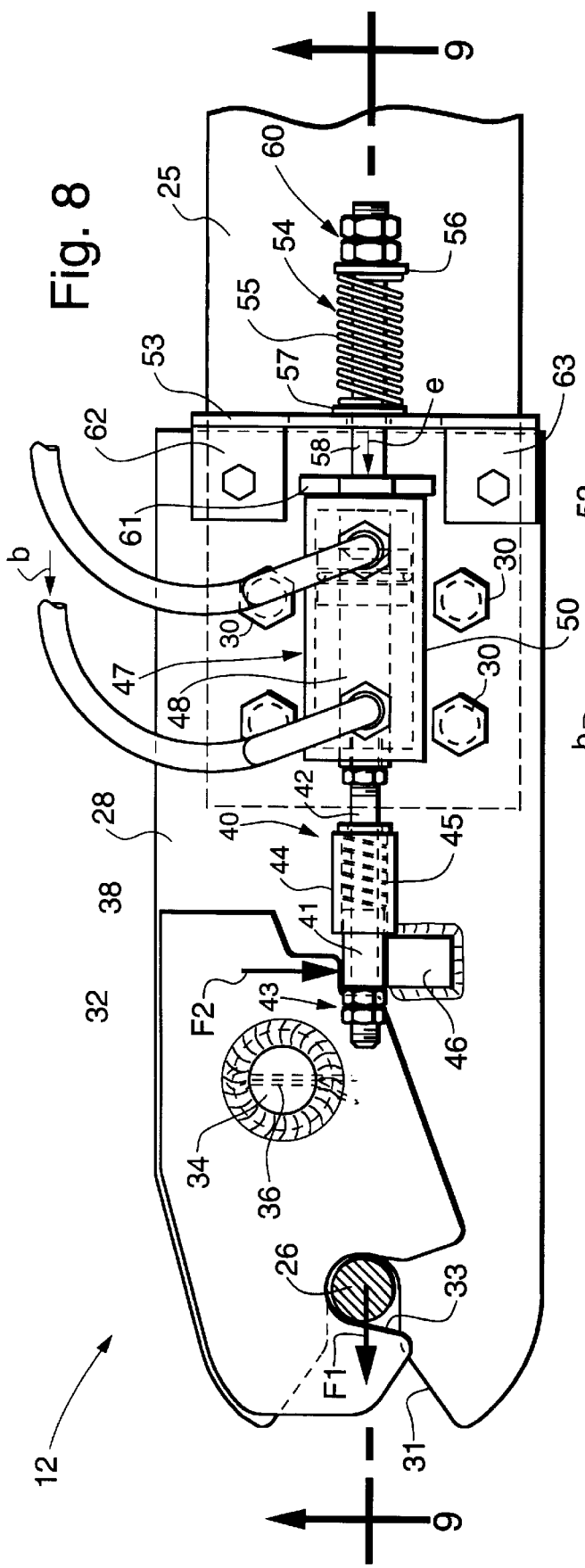
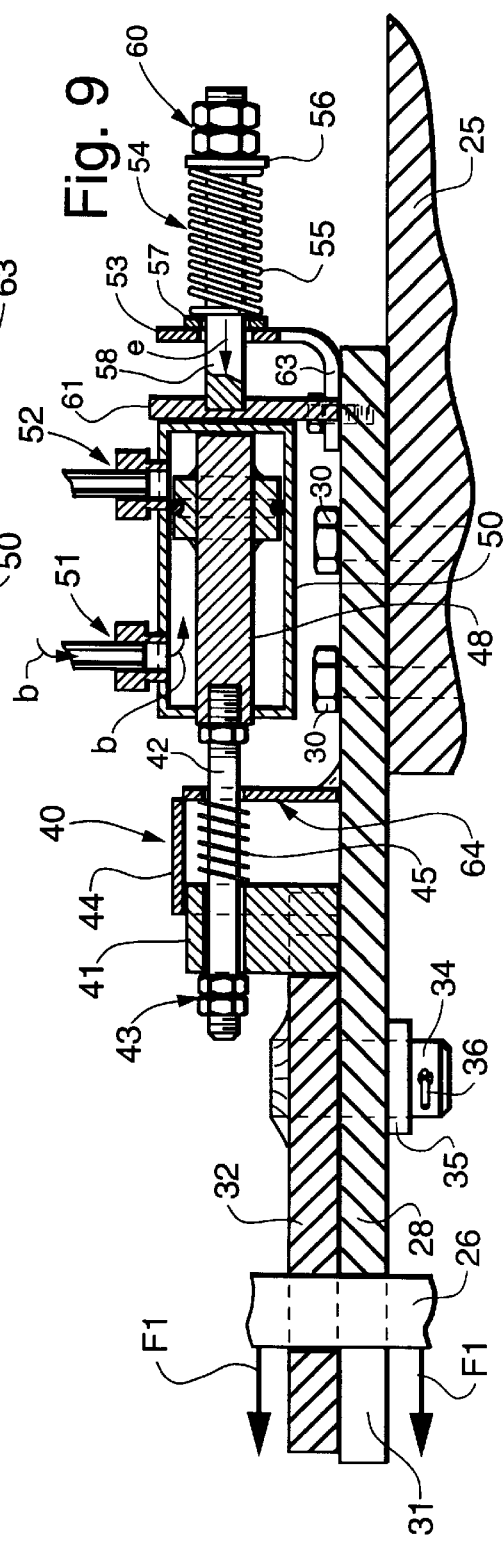

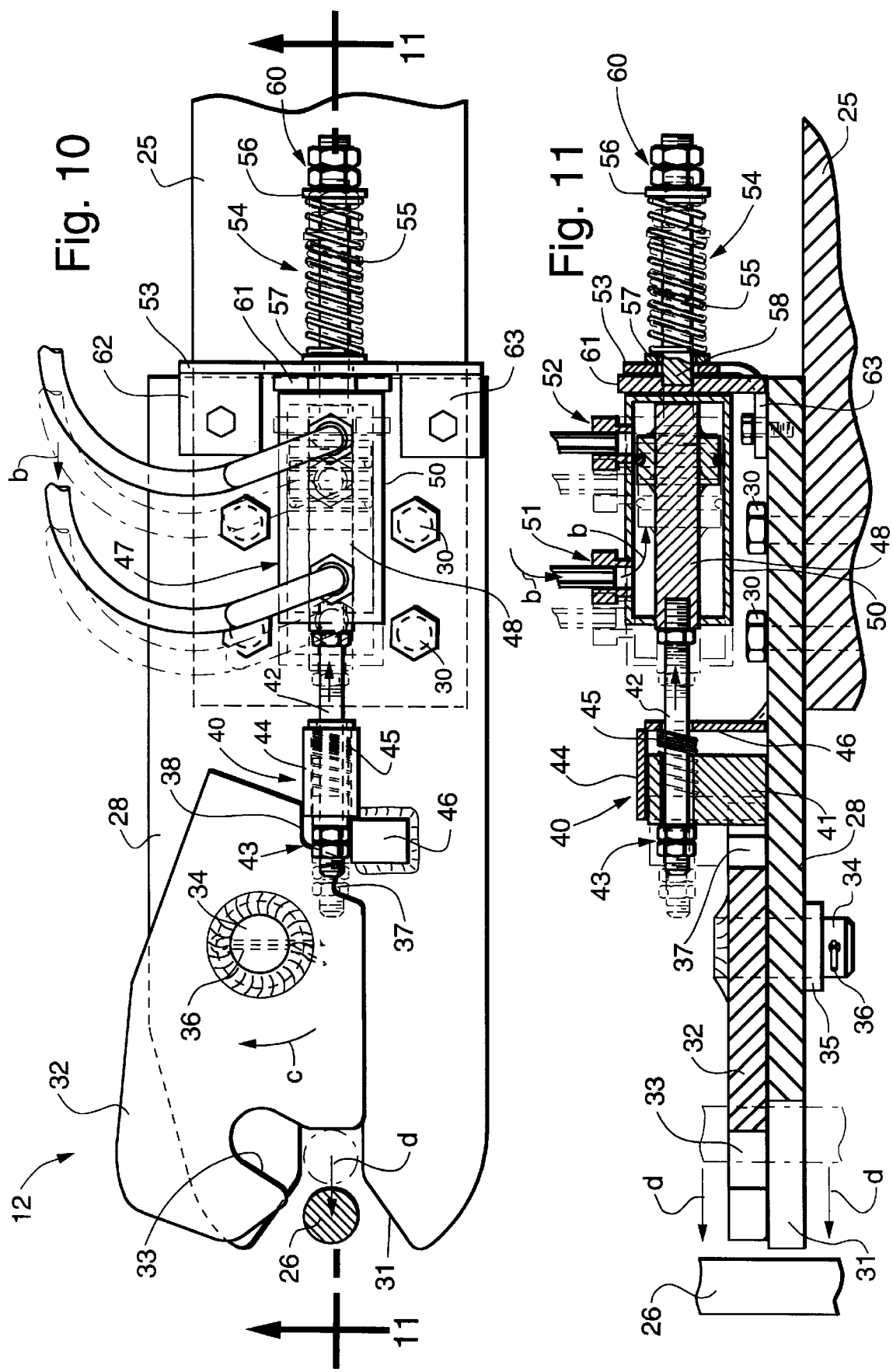

HITCH FOR AGRICULTURAL IMPLEMENT

FIELD OF THE INVENTION

The present invention relates generally to apparatus for coupling one agricultural implement, such as a forage wagon, to another agricultural implement, such as a forage harvester, and more particularly to a remotely actuatable hitch assembly for coupling and decoupling a forage wagon to the back of a forage harvester.

BACKGROUND OF THE INVENTION

Forage harvesters operate in a well known fashion in a field of windrowed or standing crop material and include either a self propelled or pull-type base unit with a header attached thereto for cutting or picking up crop material and feeding it rearwardly. Typically, the base unit includes a forward generally rectangular inlet opening for receiving crop material from the attachment, a feeding assembly spanning the width of the inlet opening for conveying material into the base unit, and a rotating cutterhead for receiving crop material from the feeding assembly and chopping it into appropriate particle sizes. Some units employ a blower for transferring the chopped material via a discharge spout to a vehicle for transporting it from the field, while others utilize the throwing action of the rotating cutterhead to convey the chopped material up a discharge spout.

One commonly known arrangement is the use of a pull-type forage harvester in combination with a tractor and a forage wagon. The tractor pulls the harvester and wagon in tandem with the wagon hitched behind the forage harvester for collecting chopped crop material that is being expelled from the spout. Representative equipment of this nature is illustrated by the disclosure in U.S. Pat. No. 3,818,955, issued Jun. 25, 1974 in the name of Joseph M. Kline. Another well known example of a pull-type forage harvester used in combination with a forage wagon attached thereto is disclosed in U.S. Pat. No. 3,786,945, issued Jan. 22, 1974 in the name of Dean Homer Symonds. Insofar as self propelled units are concerned, a common arrangement is illustrated by U.S. Pat. No. 4,376,609, issued Mar. 15, 1983 in the name of Carl E. Bohman, et al.

Regardless of the type of unit being used, it is beneficial to couple the wagon to the harvester with a hitch assembly having a latching mechanism releasable from a remote location, such as the tractor cab in the case of a pull type harvester or the harvester cab in the case of a self propelled harvester. This enables the operator to quickly and conveniently release a full wagon and prepare to attach another wagon during field operation.

In the past, remote actuation of the coupling mechanism has been accomplished by using a rope or a cable directly connected to a spring loaded latching element mounted at the rear of the forage harvester. This has been fraught with various problems generally symptomatic of the use of cables and ropes in various actuating arrangements. Routing the actuating element through the cab wall of a tractor or self propelled harvester is difficult to accomplish while still maintaining the integrity of the element, i.e., avoiding excessive wear from crimping, twisting and snagging. Further, problems have been encountered during prior efforts to design a system that provides sufficient force to overcome force exerted by the hitch pin on the latching element. This is especially prevalent under conditions where the wagon being decoupled is downhill from the harvester.

SUMMARY OF THE INVENTION

It is therefore an important object of the present invention to provide a reliable, remotely operable, latching mechanism for coupling one agricultural implement to another agricultural implement.

In pursuance of this and other important objects the present invention contemplates a new and useful hitch assembly for coupling a first agricultural implement to a second agricultural implement. More particularly the hitch comprises a substantially vertical pin affixed to the first agricultural implement, a drawbar affixed to and extending rearwardly from the second agricultural implement, and a hitch plate affixed to the drawbar. The hitch plate has a rearwardly facing notch adapted to accommodate the pin under conditions where the first agricultural implement is operatively positioned adjacent the drawbar. The hitch further comprises a latch plate, pivotally mounted on the hitch plate for reciprocation between open and closed positions, having means for holding the pin in the notch under conditions where the pin is accommodated by the notch and the latch plate is in the closed position. A latch reciprocal between extended and retracted conditions is adapted to hold the latch plate in the closed position under conditions where the latch is in the extended position. The latch plate applies a varying force against the latch under conditions where the pin is urged out of the notch at corresponding proportionate levels of varying force. Still further, the hitch comprises an actuator coupled to the latch, and means for actuating the actuator for moving the latch from the extended position to the retracted position when the force against the latch is below a predetermined threshold. Supplemental means move the latch from the extended position to the retracted position under conditions where the force against the latch moves through the threshold.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 2 is a plan view showing the hitch assembly of the present invention in the latched position.

FIG. 3 is an elevational view showing a section taken along line 3—3 of FIG. 2.

FIG. 4 is a plan view showing the hitch assembly of the present invention in the unlatched position and the hitch pin disengaged.

FIG. 5 is an elevational view showing a section taken along line 5—5 of FIG. 4.

FIG. 6 is a plan view similar to FIG. 2 showing the hitch assembly of the present invention in the latched position under conditions where dynamic forces are being applied to the latch plate by the hitch pin.

FIG. 7 is an elevational view showing a section taken along line 7—7 of FIG. 6.

FIG. 8 is a plan view similar to FIGS. 6 and 2 showing the hitch assembly of the present invention in the latched position under conditions where dynamic forces are being applied to the latch plate by the hitch pin and the actuator is energized.

FIG. 9 is an elevational view showing a section taken along line 9—9 of FIG. 8.

FIG. 10 is a plan view similar to FIG. 4 showing the hitch assembly of the present invention in the unlatched position under conditions where dynamic forces have been removed from the latch plate and the actuator is returned to the home position from its extended position (shown in phantom outline).

FIG. 11 is an elevational view showing a section taken along line 11—11 of FIG. 10.

DESCRIPTION OF THE INVENTION

Figure 1:
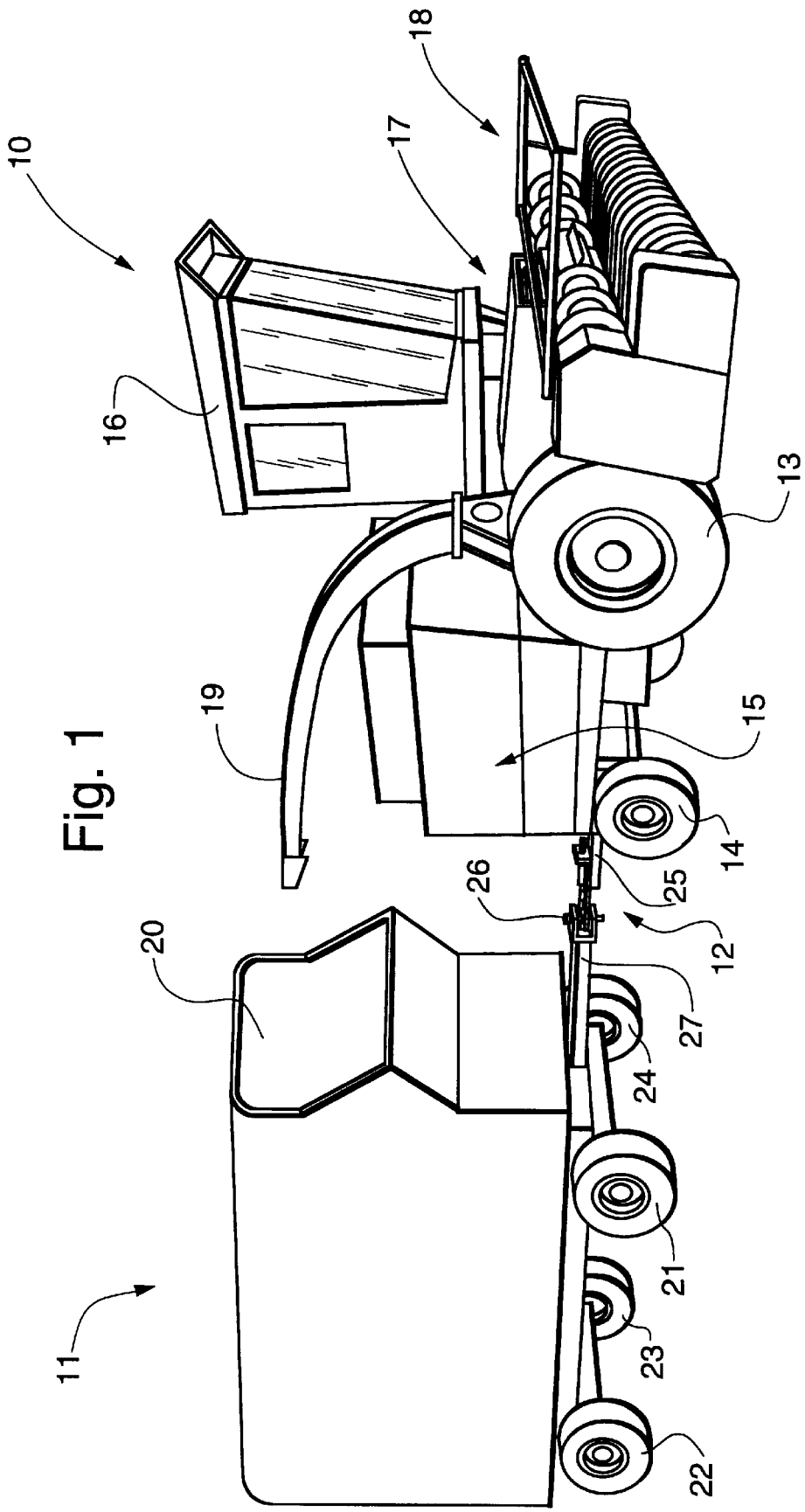
FIG. 1 is a perspective view of a self propelled forage harvester coupled to a forage wagon by a hitch assembly in which the present invention is readily embodied.

Referring now to the drawings for a more detailed description of the present invention, FIG. 1 is a perspective view showing diagrammatically a self propelled forage harvester base unit, generally designated by reference numeral 10, coupled to a trailing forage wagon, generally designated by reference numeral 11, by a hitch assembly 12 in which the preferred embodiment of the present invention is readily embodied.

Forage harvester 10 comprises ground engaging wheels 13, 14 supporting a main frame on which are mounted a power plant 15 including an engine and drive mechanisms, an operator's cab 16 with appropriate controls and monitors, and a crop processing section 17 comprising feed rolls and a cutterhead. A pickup attachment 18 is mounted on the front of the frame for engaging windrowed crop material and feeding it to the feed roll of crop processing section 17 where it is chopped and fed to a blower which blows the chopped crop upwardly and rearwardly through a discharge spout 18 into the bed of forage wagon 11 via crop inlet area 20. Other commonly known headers include row crop attachments and direct cut attachments for standing crop.

Forage wagon 11, supported on ground engaging wheels 21, 22, 23, 24, is coupled by hitch assembly 12 to a draw bar 25 extending rearwardly from forage harvester 10. Hitch assembly 12 includes a hitch pin 26 mounted on wagon tongue 27. It should be noted that forage wagon 11 and forage harvester 10 are conventional implements depicted in a standard relationship to illustrate one common functional environment for the hitch assembly of the present invention. More specifically the alliance of these implements in a vehicular train presents the requirement for a hitch assembly coupling one implement behind another, along with the desirability and convenience of remote actuation from cab 16.

Now turning to FIGS. 2 and 3 for a detailed description of hitch assembly 12, a hitch plate 28 extends rearwardly from drawbar 25 to which it is secured by a plurality of bolts 30 or other conventional means. A notch 31 opens rearwardly to receive hitch pin 26 mounted in a clevis on the forward portion of wagon tongue 27 (FIG. 1) to couple forage harvester 10 to forage wagon 11 under conditions where a latch plate 32 is disposed in the position shown in FIG. 2, i.e., in the closed position with its generally sidewardly facing notch 33 accommodating hitch pin 26. Latch plate 32, pivotally mounted on hitch plate 28 by a pivot pin 34 held in place by a washer 35 and cotter pin 36, includes a first latch block engaging surface 37 and a second latch block guide engaging surface 38, the function of which surfaces will be discussed herein below.

A latch, generally designated by reference numeral 40, is affixed to hitch plate 28 for holding latch plate 32 in its closed and open positions. It comprises a block 41 mounted on a rod extender 42 by nuts 43 for reciprocation in a latch block guide 44. Mounted in latch block guide 44 and concentric with rod extender 42 is a latch spring 45 for holding latch block 41 in the extended position between surface 37 of latch plate 32 and block 46, which position corresponds to the closed position of the hitch.

An actuator assembly, comprising a double acting hydraulic cylinder 47, includes a piston rod 48, extending from cylinder 50 and attached to rod extender 42. Piston rod 48 reciprocates in cylinder 50 in a conventional manner in response to hydraulic fluid introduced through ports 51, 52. The actuator assembly further comprises a support bracket 53, secured to hitch plate 28, and a spring assembly 54, the latter including a spring 55 mounted between washers 56, 57 on spring mounting rod 58 by nuts 60 at one end thereof. The other end of spring mounting rod 58 extends through support bracket 53 and is attached to a guide plate 61, which in turn is affixed to the end of hydraulic cylinder 47. The bottom of guide plate 61 slidably engages the upper surface of hitch plate 28 between support bracket mounting flanges 62, 63. This prevents rotation of cylinder 47.

In the remaining figures, now to be described, the above described elements are shown in various positions illustrating the operative conditions of the hitch assembly. In FIGS. 4 and 5 fluid is shown entering port 51 in direction a to drive piston rod 48 to its rightmost position in cylinder 50. This causes rod extender 42 to move in direction b, pull latch block 41 to the right and thereby compress spring 45 against the inner surface of the back wall 64 of latch block guide 44 until latch block 44 is clear of surface 37. Hitch pin 26 is then urged against latch plate 32 in direction d, causing latch plate 32 to be pivoted in direction c about pivot pin 34 until surface 38 comes in contact with latch guide block 41, as shown in FIG. 4. This is the unlatched position, i.e., the hitch pin is disengaged and the implements are decoupled.

Normal coupling can then be accomplished. The cylinder is stroked in a direction opposite to direction b. The hitch pin can now be moved back into notch 31 until it engages latch plate 32 while it is in the open position as shown in FIG. 4. Thus, the latch plate is forced to rotate about pivot pin 34 in a direction opposite to direction c until the latched position shown in FIG. 2 is attained. This allows latch block 41 to be moved by spring 45 to the closed position shown in FIG. 2. It should be noted that precision timing by the operator is obviated, i.e., there is no need to time the stroke of the cylinder with the insertion of the hitch pin into the notch.

While in the latched position forage wagon 11 trails behind forage harvester 12 and thereby exerts a dynamic force F1 on the notch 33 of latch plate 32, as illustrated in FIGS. 6 and 7. Force F1 in turn results in force F2 to be exerted against latch block 41, which is held in the extended position and prevents latch plate 32 from releasing hitch pin 26. Force F1 is also exerted at varying levels when wagon 11 is downhill from harvester 10, regardless of whether the units are in motion.

Under conditions where force F2 exceeds a predetermined theshhold level, latch block 41 will be maintained in the extended position when hydraulic fluid b (FIGS. 8 and 9) enters port 51, i.e., the axial force exerted on piston rod 47 and rod extender 42 is not sufficient to overcome the resulting frictional force, caused by perpendicular force F2, on the surface of latch block 41. This causes cylinder 48 to move in direction e and compress spring 55 against washer 57 of spring assembly 54.

This latched condition shown in FIGS. 8 and 9 will be maintained until force F2 exerted on latch block 41 drops below the predetermined threshold level. When this occurs, hydraulic cylinder 47 will return from the condition shown in phantom outline in FIGS. 10 and 11 to the condition shown in solid lines, permitting latch plate 32 to pivot about pivot pin 34 in direction c and release hitch pin 26 in direction d, i.e., to the disengaged position, as also shown in FIGS. 4 and 5.

During field operation, it not uncommon to require decoupling under conditions where the forage wagon is in a position to exert a holding force on the latch. When this occurs the operator moves the wagon back and forth to release the force, which automatically effects decoupling via the unique supplemental action of spring assembly 54.

Of the many implicit and explicit advantages of the present invention one of the most important is the provision of a hitch assembly for reliably decoupling a forage wagon by remote means in a manner not heretofore known, regardless of varying relative elevational positions of the implements.

While preferred structure, in which the principles of the present invention are embodied, is shown and described above, it is to be understood that the invention is not limited to such preferred structure, but that, in fact, widely different means of varying scope and configuration may be employed in the practice of the invention.

Having thus described the invention, what is claimed is:

1. A hitch for coupling a first agricultural implement to a second agricultural implement, said hitch comprising
    a pin adapted to be affixed to said first agricultural implement,
    a drawbar adapted to be affixed to and extend rearwardly from said second agricultural implement,
    a hitch plate affixed to said drawbar, said hitch plate having a rearwardly facing notch adapted to accommodate said pin under conditions where said first agricultural implement is positioned adjacent said drawbar,
    a latch plate pivotally mounted on said hitch plate for reciprocation between open and closed positions, said latch plate having means for holding said pin in said notch under conditions where said pin is accommodated by said notch and said latch plate is in said closed position,
    a latch reciprocal between extended and retracted conditions, said latch holding said latch plate in said closed position under conditions where said latch is in said extended position, said latch plate applying a varying force against said latch under conditions where said pin is urged out of said notch at corresponding proportionate levels of varying force, and
    an actuator coupled to said latch,
    said actuator comprising means for moving said latch from said extended position to said retracted position when said force against said latch is below a predetermined threshold,
    said actuator further comprising supplemental means for moving said latch from said extended position to said retracted position under conditions where said force against said latch moves through said threshold.

2. A hitch as set forth in claim 1 wherein said latch comprises
    a latch block for engaging said latch plate when said latch plate is in said closed position, and
    a latch spring for urging said latch block into said extended condition.

3. A hitch as set forth in claim 2 wherein said means for moving said latch comprises
    a double acting cylinder having a piston operable within said cylinder between extended and retracted positions, and
    a rod extending along the axis of said latch spring, coaxial with said piston, and attached to said latch block.

4. A hitch as set forth in claim 3 wherein said means for moving said latch further comprises
    means for supplying fluid to said cylinder to reciprocate said piston between said extended and retracted positions, whereby said latch plate pivots to its open position from its closed position under conditions where said force against said latch block is below said threshold.

5. A hitch as set forth in claim 4 wherein said supplemental means comprise
    means for mounting said cylinder to move relative to said piston from a home position to an intermediate position toward said latch block when said force is above said threshold.

6. A hitch as set forth in claim 5 wherein said supplemental means further comprise
    spring means attached to said cylinder to return it from said intermediate position to said home position when said force is moved through said threshold.

7. A hitch for coupling a forage wagon to a forage harvester, said hitch comprising
    a pin adapted to be affixed to forage wagon,
    a drawbar adapted to be affixed to and extend rearwardly from said forage harvester,
    a hitch plate affixed to said drawbar, said hitch plate having a rearwardly facing notch adapted to accommodate said pin under conditions where said forage wagon is positioned adjacent said drawbar,
    a latch plate pivotally mounted on said hitch plate for reciprocation between open and closed positions, said latch plate having means for holding said pin in said notch under conditions where said pin is accommodated by said notch and said latch plate is in said closed position,
    a latch reciprocal between extended and retracted conditions, said latch holding said latch plate in said closed position under conditions where said latch is in said extended position, said latch plate applying a varying force against said latch under conditions where said pin is urged out of said notch at corresponding proportionate levels of varying force, and an actuator coupled to said latch,
    said actuator comprising means for moving said latch from said extended position to said retracted position when said force against said latch is below a predetermined threshold, the improvement comprising
    said actuator further comprising supplemental means for moving said latch from said extended position to said retracted position under conditions where said force against said latch moves through said threshold.

8. A hitch as set forth in claim 7 wherein said latch comprises
    a latch block for engaging said latch plate when said latch plate is in said closed position, and
    a latch spring for urging said latch block into said extended condition.

9. A hitch as set forth in claim 8 wherein said improvement further comprises
    said means for moving said latch comprises
    a double acting cylinder having a piston operable within said cylinder between extended and retracted positions, and
    a rod extending along the axis of said latch spring, coaxial with said piston, and attached to said latch block.

10. A hitch as set forth in claim 9 wherein said improvement further comprises said means for moving said latch further comprises means for supplying fluid to said cylinder to reciprocate said piston between said extended and retracted positions, whereby said latch plate pivots to its open position from its closed position under conditions where said force against said latch block is below said threshold.

11. A hitch as set forth in claim 10 wherein said supplemental means comprise means for mounting said cylinder to move relative to said piston from a home position to an intermediate position toward said latch block when said force is above said threshold.

12. A hitch as set forth in claim 11 wherein said supplemental means further comprise spring means attached to said cylinder to return it from said intermediate position to said home position when said force is moved through said threshold.

* * * * *